July 15, 1969  R. E. JEPSEN  3,455,565

PISTON RINGS

Filed July 29, 1964

INVENTOR.
ROBERT E. JEPSEN
BY Ronald P. Sherer

ATTORNEY

United States Patent Office 3,455,565
Patented July 15, 1969

3,455,565
PISTON RINGS
Robert E. Jepsen, Whitehall Township, Lehigh County, Pa., assignor to Air Products and Chemicals, Inc., a corporation of Delaware
Filed July 29, 1964, Ser. No. 385,947
Int. Cl. F16j 9/06, 9/14
U.S. Cl. 277—138   4 Claims The present invention relates to an improved piston ring for effecting a fluid tight seal between a reciprocating piston and the surrounding cylinder. More particularly, the present invention relates to an improved piston ring which is self-sealing throughout a substantially extended wear-life.

In brief, the present invention provides a piston ring of resilient material having circumferentially extending, radially overlapping end portions forming a self-sealing joint; said joint being in the form of a continuous curve and, in the preferred embodiment, said joint having a radius of curvature greater than one-half the internal diameter of the ring and less than the external diameter of the ring.

It is therefore the primary object of the present invention to provide a piston ring capable of effecting an improved fluid-tight seal between relatively moving parts. More specifically, it is the object of the present invention to provide an expandable piston ring having a completely self-sealing joint whereby the wear-life of the piston ring is increased many fold as compared to conventional piston rings having linear joint interfaces or tongue-and-groove joints.

The above objects, as well as others relating more particularly to the details of construction and operation, will become more fully apparent from the following description when taken with the accompanying drawings in which.

Figure 1:
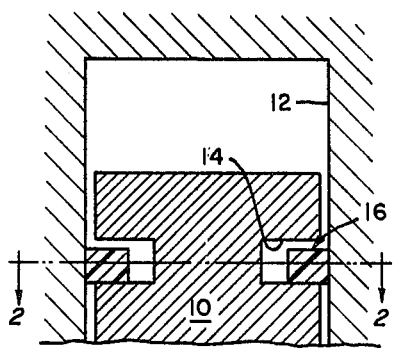
FIGURE 1 is a sectional view of a piston, cylinder, and piston ring assembly.

Referring first to FIGURE 1, numeral 10 designates a vertically reciprocating piston adapted to operate with a cylinder 12 the latter of which may form the working chamber of a pump, compressor, fluid motor, or the like. Piston 10 includes a groove 14 which is adapted to receive a piston ring 16 and it will be noted that the axial dimension of the groove is greater than that of ring 16 whereby high pressure fluid is readily admitted behind the piston ring so as to force the ring radially outwardly into seating relationship with the cylinder walls.

Figure 2:
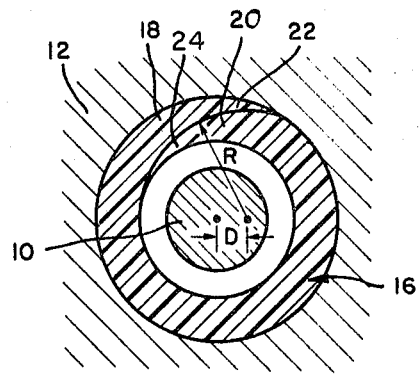
FIGURE 2 is a sectional view of the assembly taken along line 2—2 of FIGURE 1.

As shown more clearly in FIGURE 2, ring 16 is formed with smoothly tapered overlapping ends 18 and 20 the extremities of which comprise relatively thin tip portions 22 and 24. Furthermore, it will be noted that the interface formed by the abutting surfaces of ends 18 and 20 comprises a continuous arc having a radius of curvature R. Thus, the present invention departs from prior piston ring design in that the interengaging ends of the ring do not form a linear or stepped or tongue-and-groove joint as is common in the prior art. Instead, relatively long, arcuate ends are provided such that two advantageous results are obtained. First, the relatively thin ends 18 and 20, and particularly the thinner tip portions 22 and 24, become highly flexible so that the fluid pressure within the ring maintains the overlapping ends in very tight sealing engagement with each other and with the walls of cylinder 12. Secondly, and most importantly, the entire ring is able to expand radially and circumferentially without separation of the surfaces forming the interface between ends 18 and 20. That is, if the ring expands either because of thermal expansion and/or because of peripheral wear, the ends 18 and 20 will move in circumferentially opposite directions while the internal pressure maintains the tapered ends in tight sealing engagement with each other over the entire extent of the arcuate interface. In fact, actual wear-life tests of rings operated in accordance with the foregoing disclosure have been found to maintain excellent sealing capacity for periods from five to eight times the wear-life of conventional rings having linear or tongue-and-groove joints. In addition to this extended wear-life, it is to be noted that rings designed in accordance with the present invention are distinguished from prior art rings in that rings of the present invention do not require an initial gap between the ring ends to allow for manufacturing tolerances and thermal expansion. Thus, the rings of the present invention permit no blow-by to occur through ring gaps so that their initial sealing efficiency is substantially greater than that of prior art rings.

From the foregoing description it will be apparent that it is the provision of a continuous, arcuate interface between the radially overlapping ends of the ring which accounts for the substantial increase in initial as well as extended sealing capability. However, it has been further discovered that maximum wear-life is obtained when the radius of curvature R is made greater than the internal ring radius and less than the external ring diameter. Furthermore, it has been found that the center of revolution of radius R should be positioned on a diameter of the ring at a point spaced from the center of the ring by a distance D which is less than one-half the internal ring radius so that the taper angle of radially inner tip 24 is less than that of radially outer tip 22. As a result, the thicker tip portion 22 which is subject to frictional wear provides maximum heat conduction away from the periphery while the thinner tip portion 24 is more deformable and therefore provides maximum sealing engagement against end 18. In addition, it has been discovered that, within the above criteria, maximum wear-life will result if the radius of curvature R is such that the individual radial thicknesses of end 18 are in the order of two-thirds of the radial thickness of the ring when measured at the mid-point of the arcuate interface. Thus, the present invention encompasses not only the several-fold increase in wear-life of the ring which results from the provision of continuous arcuate interface between the radially overlapping ends of the ring but, in addition, the invention includes the more specific criteria for determining the optimum curvature of the interface whereby wear-life periods may be extended by a factor in the order of eight times that of prior art rings.

At this point, it should be noted that the foregoing description is generally applicable to rings composed of all previously known materials including metal, plastic, leather, and rubber. However, it will be apparent that the choice of material must be related to the magnitude of the biasing force which is employed to urge the ends of the ring into firm sealing engagement with each other and with the cylinder wall and, in this regard, it will be apparent that the use of more deformable material such as plain or filled Teflon is particularly advantageous in the case of nonlubricated pumps, compressors, and fluid motors wherein the fluid biasing forces normally are much less than those encountered in internal combustion engines; metallic rings being preferable in the latter case where lubricant contamination is not a serious problem.

Figure 3:
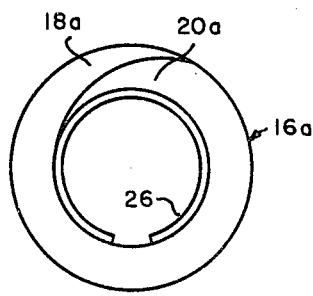
FIGURE 3 is a top, plan view of a piston ring using alternative biasing means.

Although the foregoing description has assumed the use of the working fluid for effecting the sole biasing force on the ring, it will be equally apparent that an expansion ring may be employed in addition to, or in place of, the biasing force created by the fluid. Accordingly, FIGURE 3 illustrates the use of an expansion ring 26 which may be fitted within the piston ring 16a so as to exert a radially outward biasing force for maintaining overlapping ends 18a and 20a in proper sealing engagement.

Figure 4:
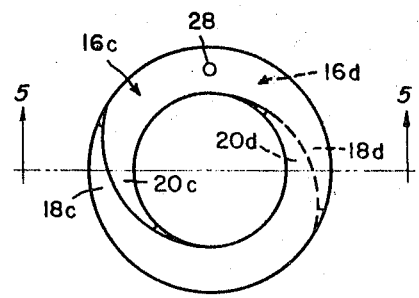
FIGURE 4 is a top, plan view of an alternative form of the piston ring.
Figure 5:
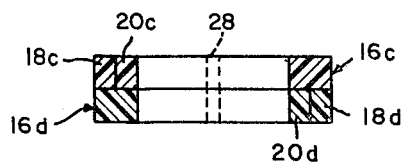
FIGURE 5 is a sectional view of the ring taken along line 5—5 of FIGURE 4.

Reference is now made to FIGURES 4 and 5 which illustrate an alternative form of the present invention. In this case, two rings 16c and 16d are provided in axial alignment and adapted to be positioned in the same piston groove. The two rings are formed with radially overlapping ends 18c, 20c, and 18d, 20d, respectively. Of course, it is to be understood that, for maximum wear-life, the interfaces of these ends are formed in accordance with the criteria disclosed hereinabove. The interfaces are preferably positioned on diametrically opposite sides of the combined ring and secured against relative circumferential movement by an axially extending pin 28. In this manner, careful forming of the tip extremities may be eliminated and, in fact, the tips may be cut off as shown most clearly in FIGURE 4.

With regard to the selection of materials, the embodiment of the invention illustrated in FIGURES 4 and 5 enables different materials to be employed for optimum sealing and wear-life. For example, it has been discovered that upper ring 16c may be composed of a plastic or metallic composite containing one or more dry film lubricants such as molybdenum disulfide or tungsten diselenide while lower ring 16d may be composed of a nonlubricating material having maximum sealing properties. This combination has been found to be particularly advantageous in that the upper ring deposits a continuous film of lubricant as it wears while the lower ring provides the physical properties necessary for good sealing and minimum wear. For example, it has been found that the wear-life of such a combination is eight to ten times greater than any combination of prior art rings which were tested.

From the foregoing description of the preferred embodiments of the invention it will be readily apparent that numerous variations are possible and particularly as to the specific magnitude of curvature of the piston ring joint or interface. Therefore, it is to be understood that the foregoing disclosure is intended to be illustrative rather than exhaustive of the invention and that the true invention is not to be limited other than as set forth in the following claims including all patentable equivalents thereof.

What is claimed is:

1. In a piston and cylinder assembly, the improvement comprising: an annular, one-piece ring carried by said piston, means providing a predetermined biasing force acting upon the internal surface of said ring in the radially outward direction, said ring having integral, circumferentially extending, tapered end portions overlapping each other along the radial direction so as to form a sealed interface, said interface comprising a continuous arc forming a portion of a circle having a predetermined radius, whereby, upon expansion of said ring, said tapered end portions move in circumferentially opposite directions while maintaining a sealed relationship with said cylinder and with each other along the continuous extent of said arcuate interface, said predetermined radius being greater than the internal radius of said ring and less than the external diameter of said ring, said predetermined radius having a center of revolution positioned on a diameter of said ring spaced from the center of said ring by a distance less than one-half of the internal ring radius such that the radial outer end portion has a radial thickness greater than the radial thickness of the radial inner end portion.

2. In a piston and cylinder assembly, the improvement comprising: an annular, one-piece ring carried by said piston, means providing a predetermined biasing force acting upon the internal surface of said ring in the radially outward direction, said ring having circumferentially extending, tapered end portions overlapping each other along the radial direction, each of said overlapping end portions terminating in thinner, highly flexible tip portions, the radially inner tip portion being at least as thin as the radially outer tip portion, said overlapping end and tip portions forming a sealed interface, said interface comprising a single continuous arc forming a portion of a circle having a finite radius such that, upon peripheral wear of the ring, said tapered end and tip portions move in circumferentially opposite directions while maintaining a sealed relationship with the cylinder and with each other along said continuous arcuate interface extending between the extremities of said radially inner and outer tip portions.

3. The invention as claimed in claim 1 wherein the radial thickness of the radially outer end portion is greater than the radial thickness of the radial inner end portion when measured at the mid-point of said arcuate interface.

4. The invention as claimed in claim 2 wherein said means providing a predetermined biasing force comprise passage means in the piston for applying fluid pressure against the internal surface of the ring and forcing said highly flexible inner tip portion into effective sealing engagement with said outer end portion along said interface.

References Cited

UNITED STATES PATENTS

| 1,094,057 | 4/1914 | Chevrolet | 277—193 |
| 1,391,845 | 9/1921 | Moratta | 277—190 |
| 1,052,726 | 2/1913 | King | 277—199 X |
| 1,357,729 | 11/1920 | Schaap | 277—222 X |
| 2,375,869 | 5/1945 | Price | 277—199 |
| 2,816,575 | 12/1957 | Stokes | 277—222 X |
| 2,973,978 | 3/1961 | Oppenheim | 277—188 |
| 3,145,629 | 8/1964 | Gottzmann | 277—157 |
| 2,569,777 | 10/1951 | Phillips | 277—222 |

FOREIGN PATENTS 928,749  6/1963  Great Britain.

LAVERNE D. GEIGER, Primary Examiner

JEFFREY S. MEDNICK, Assistant Examiner

U.S. Cl. X.R.

277—156, 197, 218, 222